US011753545B2

(12) United States Patent
Morishita et al.

(10) Patent No.: US 11,753,545 B2
(45) Date of Patent: Sep. 12, 2023

(54) GEL COMPOSITION, CABLE FILLER, CABLE, AND CRUMB FOR GEL COMPOSITION

(71) Applicant: KURARAY CO., LTD., Kurashiki (JP)

(72) Inventors: Yoshihiro Morishita, Kamisu (JP); Yuta Tomishima, Kamisu (JP); Shinya Oshita, Pasadena, TX (US); Asako Minamide, Hattersheim am Main (DE)

(73) Assignee: KURARAY CO., LTD., Kurashiki (JP)

( * ) Notice: Subject to any disclaimer, the term of this patent is extended or adjusted under 35 U.S.C. 154(b) by 547 days.

(21) Appl. No.: 16/618,277

(22) PCT Filed: May 31, 2018

(86) PCT No.: PCT/JP2018/020984

§ 371 (c)(1),
(2) Date: Nov. 29, 2019

(87) PCT Pub. No.: WO2018/221661

PCT Pub. Date: Dec. 6, 2018

(65) Prior Publication Data

US 2020/0148883 A1 May 14, 2020

(30) Foreign Application Priority Data

May 31, 2017 (JP) ................................ 2017-108564

(51) Int. Cl.

| | |
|---|---|
| ***C08L 91/00*** | (2006.01) |
| ***C08F 297/04*** | (2006.01) |
| ***C08J 3/075*** | (2006.01) |
| ***G02B 6/44*** | (2006.01) |

(52) U.S. Cl.

CPC .......... *C08L 91/00* (2013.01); *C08F 297/046* (2013.01); *C08J 3/075* (2013.01); *G02B 6/4494* (2013.01); *C08L 2207/322* (2013.01)

(58) Field of Classification Search

CPC ................ C08L 91/00; C08L 2207/322; C08F 297/046; G02B 6/4494; C08J 3/075

See application file for complete search history.

(56) References Cited

U.S. PATENT DOCUMENTS

| | | | |
|---|---|---|---|
| 5,737,469 | A | 4/1998 | Costello et al. |
| 6,414,059 | B1 | 7/2002 | Kobayashi et al. |
| 9,156,978 | B1 | 10/2015 | Cai et al. |
| 9,182,560 | B2 | 11/2015 | Dupont et al. |
| 2002/0055562 | A1 | 5/2002 | Butuc |
| 2005/0004274 | A1 | 1/2005 | Healy et al. |
| 2006/0205849 | A1 | 9/2006 | St. Clair |
| 2006/0205904 | A1 | 9/2006 | St. Clair |
| 2007/0213241 | A1 | 9/2007 | St. Clair |
| 2007/0284131 | A1 | 12/2007 | Dower et al. |
| 2008/0161485 | A1 | 7/2008 | Suzuki et al. |
| 2009/0149578 | A1 | 6/2009 | Nakamura et al. |
| 2009/0232753 | A1 | 9/2009 | Healy et al. |
| 2011/0045983 | A1 | 2/2011 | Healy et al. |
| 2011/0245405 | A1 | 10/2011 | Jogo et al. |
| 2015/0219796 | A1 | 8/2015 | Salazar |
| 2016/0362545 | A1* | 12/2016 | Bening ................. C08L 53/025 |
| 2017/0044371 | A1 | 2/2017 | Ono |
| 2017/0101499 | A1 | 4/2017 | Nakatani et al. |
| 2017/0275440 | A1 | 9/2017 | Jogo et al. |
| 2018/0016413 | A1* | 1/2018 | Bening .................. C08L 53/02 |
| 2019/0329207 | A1 | 10/2019 | de Groot |
| 2020/0148883 | A1 | 5/2020 | Morishita et al. |

FOREIGN PATENT DOCUMENTS

| | | | |
|---|---|---|---|
| CN | 1324380 | A | 11/2001 |
| CN | 105980449 | A | 9/2016 |
| CN | 106459250 | A | 2/2017 |
| CN | 106661309 | A | 5/2017 |
| EP | 3 564 320 | A1 | 11/2019 |
| JP | 10-67913 | A | 3/1998 |
| JP | 2003-292666 | A | 10/2003 |
| JP | 2005-255882 | A | 9/2005 |
| JP | 2010-126636 | A | 6/2010 |
| JP | 2015-527448 | A | 9/2015 |
| JP | 2015-209495 | A | 11/2015 |
| JP | 6483934 | B1 | 3/2019 |

(Continued)

OTHER PUBLICATIONS

Japanese Office Action dated Oct. 19, 2021 in Japanese Patent Application No. 2019-024780, 3 pages.
Combined Chinese Office Action and Search Report dated Mar. 29, 2021 in corresponding Chinese Patent Application No. 201880035965.0 (with English Translation of Category of Cited Documents), 15 pgs.
Office Action dated Feb. 22, 2021 in corresponding Indian Patent Application No. 201947049116 (with English Translation), 7 pages.
Extended European Search Report dated Oct. 23, 2020 in European Patent Application No. 18809799.2, 5 pages.
Russian Federation Office Action dated Sep. 24, 2021 in Russian Federation Patent Application No. 2019138711/04(076341) (with English translation), 20 pages.

(Continued)

*Primary Examiner* — Robert D Harlan
(74) *Attorney, Agent, or Firm* — Oblon, McClelland, Maier & Neustadt, L.L.P.

(57) ABSTRACT

A gel composition is a gel composition containing a base oil (a) and a hydrogenated block copolymer (b), wherein the hydrogenated block copolymer (b) is a hydrogenated product of a diblock copolymer composed of a polymer block (A) consisting mainly of a structural unit derived from an aromatic vinyl compound and a polymer block (B) consisting mainly of a structural unit derived from a conjugated diene compound, the content of the polymer block (A) in the hydrogenated block copolymer (b) being 38.0 to 45.0% by mass; and the content of the hydrogenated block copolymer (b) in the gel composition is 1 to 20 parts by mass based on 100 parts by mass of the total amount of the base oil (a) and the hydrogenated block copolymer (b).

16 Claims, No Drawings

(56) References Cited

FOREIGN PATENT DOCUMENTS

| | | | |
|---|---|---|---|
| RU | 2 395 886 | C1 | 7/2010 |
| RU | 2 439 130 | C2 | 1/2012 |
| SU | 1 367 418 | A1 | 10/1994 |
| TW | 201811924 | A | 4/2018 |
| WO | WO 2006/088187 | A1 | 8/2006 |
| WO | WO 2006/098980 | A2 | 9/2006 |
| WO | WO 2007/013541 | A1 | 2/2007 |
| WO | WO 2010/024382 | A1 | 3/2010 |

OTHER PUBLICATIONS

International Search Report dated Aug. 14, 2018 in PCT/JP2018/020984 filed on May 31, 2018, 2 pages.

Combined Chinese Office Action and Search Report dated Apr. 29, 2021 in corresponding Russian Patent Application No. 2019138711 (with English Translation), 25 pages.

Pre-Grant Opposition issued in Indian Patent Application No. 2019470491 dated Nov. 11, 2022.

Official Communication issued in Indian Application 201947049116 dated May 12, 2023 (w/English Language Translation).

Official Communication issued in Indian Application 2019470491 dated May 12, 2013 (w/English Language Translation).

* cited by examiner

GEL COMPOSITION, CABLE FILLER, CABLE, AND CRUMB FOR GEL COMPOSITION

TECHNICAL FIELD

The present invention relates to a gel composition, a cable filling material composed of the gel composition, a cable including the gel composition, and a crumb for the gel composition.

BACKGROUND ART

Cables, such as optical fiber cables and electrical wire cables, are generally laid in a state that one or more cables and the like are housed in a resin-made protective tube or the like. Accordingly, there is involved such a problem that when on laying, an impact or stress is applied to the protective tube, the protective tube and the internal cable, or the internal cables, interfere with each other, to damage the internal cable. As a method for dissolving this problem, for example, there is a method of filling a cushioning material, such as a gel composition, in an air gap between the protective tube and the cable. In addition, in the case of an optical fiber cable, in order to prevent the fine optical fiber wire core from damaging, there is also a method of filling a cushioning material, such as a gel composition, in the surrounding of the optical fiber wire core within the cable.

The cushioning material which is used for such an application is not only required to have elasticity for protecting the interior but also required to have a viscosity to an extent that it is able to be easily filled in the protective tube or cable, and in the case where the protective tube or cable is damaged, the filling material does not flow out from the interior. In addition, the cushioning material is demanded to have properties exhibiting fixed characteristics under various temperatures and to have such properties that in the case where the protective tube or cable is damaged, it is able to prevent water from penetration into the interior.

As for such a gel composition, for example, PTL 1 describes a filling material containing a specified oil, a styrene-(ethylene/propylene) diblock copolymer, an optical antioxidant, and an optical metal deactivator. In addition, PTL 2 describes a cable fill composition for optical fiber composition containing (i) a Fischer-Tropsch derived base oil: and (ii) a thickening system, wherein the thickening system contains at least one block copolymer.

CITATION LIST

Patent Literature

PTL 1: JP-A 10-67913

PTL 2: JP-T 2015-527448

SUMMARY OF INVENTION

Technical Problem

The filling material compositions described in PTLs 1 and 2 have a viscosity suitable for such an application, are able to prevent water from penetration into the protective tube, and are low in temperature dependency; however, more improvements in performances are desired.

In view of the aforementioned problems of the background art, the present invention has been made, and an object thereof is to provide a gel composition which is able to be easily filled in the protective tube or cable during manufacturing a cable, is high in a dropping point (temperature of change from a semisolid to a liquid), and has such a characteristic that even in the case where the protective tube or cable is broken, the filling material does not flow out from the interior under a wide-range temperature and is also able to prevent water from penetration into the interior.

Solution to Problem

The present inventors made extensive and intensive investigations. As a result, it has been found that the aforementioned problem can be solved by using a hydrogenated product of a diblock copolymer composed of a polymer block consisting mainly of a structural unit derived from an aromatic vinyl compound and a polymer block consisting mainly of a structural unit derived from a conjugated diene compound in a specified ratio and a base oil in a specified proportion, thereby leading to accomplishment of the present invention.

Specifically, the present invention relates to the following [1] to [4].

[1] A gel composition containing a base oil (a) and a hydrogenated block copolymer (b), wherein the hydrogenated block copolymer (b) is a hydrogenated product of a diblock copolymer composed of a polymer block (A) consisting mainly of a structural unit derived from an aromatic vinyl compound and a polymer block (B) consisting mainly of a structural unit derived from a conjugated diene compound, the content of the polymer block (A) in the hydrogenated block copolymer (b) being 38.0 to 45.0% by mass, and the content of the hydrogenated block copolymer (b) in the gel composition is from 1 to 20 parts by mass based on 100 parts by mass of the total amount of the base oil (a) and the hydrogenated block copolymer (b).

[2] A cable filling material, which is composed of the gel composition as set forth in the above [1].

[3] A cable including the gel composition as set forth in the above [1].

[4] A crumb for gel composition, containing a hydrogenated block copolymer (b), wherein the hydrogenated block copolymer (b) is a hydrogenated product of a diblock copolymer composed of a polymer block (A) consisting mainly of a structural unit derived from an aromatic vinyl compound and a polymer block (B) consisting mainly of a structural unit derived from a conjugated diene compound, the content of the polymer block (A) in the hydrogenated block copolymer (b) being from 38.0 to 45.0% by mass.

Advantageous Effects of Invention

In accordance with the present invention, it is possible to provide a gel composition which is able to be easily filled in the protective tube or cable during manufacturing a cable, is high in a dropping point (temperature of change from a semisolid to a liquid), and has such a characteristic that even in the case where the protective tube or cable is broken, the filling material does not flow out from the interior under a wide-range temperature and is also able to prevent water from penetration into the interior.

DESCRIPTION OF EMBODIMENTS

Gel Composition

The gel composition of the present invention is a gel composition containing a base oil (a) and a hydrogenated block copolymer (b), wherein the hydrogenated block copolymer (b) is a hydrogenated product of a diblock copolymer composed of a polymer block (A) consisting mainly of a structural unit derived from an aromatic vinyl compound and a polymer block (B) consisting mainly of a structural unit derived from a conjugated diene compound, the content of the polymer block (A) in the hydrogenated block copolymer (b) being 38.0 to 45.0% by mass; and the content of the hydrogenated block copolymer (b) in the gel composition is 1 to 20 parts by mass based on 100 parts by mass of the total amount of the base oil (a) and the hydrogenated block copolymer (b).

Respective components of the resin composition of the present invention are hereunder successively described.

Base Oil (a)

Examples of the base oil (a) which is used in the present invention include a mineral oil and a synthetic oil.

Examples of the mineral oil include a paraffin-based mineral oil and a naphthene-based mineral oil, which are obtained by a usual refining process, such as solvent refining and hydrorefining; and further, a wax produced through the Fischer-Tropsch process or the like (gas-to-liquid wax) and a mineral oil obtained by isomerizing a wax.

Examples of the synthetic oil include a hydrocarbon-based synthetic oil and an ether-based synthetic oil. Examples of the hydrocarbon-based synthetic oil include α-olefin oligomers, such as polybutene, polyisobutylene, a 1-octene oligomer, a 1-decene oligomer, and an ethylene-propylene copolymer, or hydrides thereof, alkylbenzenes, and alkylnaphthalenes. Examples of the ether-based synthetic oil include a polyoxyalkylene glycol and polyphenyl ether.

The base oil (a) may be any one selected from the aforementioned mineral oils and synthetic oils, two or more of the mineral oils, two or more of the synthetic oils, or a mixture of one or more of the mineral oils and one or more of the synthetic oils.

In the present invention, from the viewpoint of even in the case where a compounding ratio of the hydrogenated block copolymer (b) in the gel composition is small, obtaining a gel composition having a viscosity suited as the filling material for cable, a mineral oil is preferred, and at least one selected from a paraffin-based mineral oil and a naphthene-based mineral oil is more preferred. Furthermore, from the viewpoint that the polymer block (A) in the hydrogenated block copolymer (b) is hardly plasticized to improve the dropping point of the gel composition, a paraffin-based mineral oil is still more preferred.

The mineral oil and the synthetic oil which are used in the present invention are classified in Groups I, II, III, IV, and V in the base oil classification of American Petroleum Institute. Among those, paraffin-based oils classified in Group II and Group III are preferred because the sulfur content is low, and the saturated substance content is high, paraffin-based mineral oils classified into Group II are especially preferred.

The base oil (a) in the present invention is preferably one containing a paraffin and a naphthene and having a mass ratio of the paraffin to the naphthene [paraffin/naphthene] of 10/90 to 90/10. When the mass ratio of the paraffin to the naphthene falls within the aforementioned range, the polymer block (A) in the hydrogenated block copolymer (b) is hardly plasticized, and the dropping point of the gel composition is improved. From this viewpoint, the mass ratio of the paraffin to the naphthene [paraffin/naphthene] is preferably 20/80 to 90/10, more preferably 30/70 to 90/10, still more preferably 40/60 to 90/10, yet still more preferably 50/50 to 90/10, even yet still more preferably 60/40 to 90/10, and especially preferably 60/40 to 80/20.

A viscosity index of the base oil (a) which is used in the present invention is preferably 70 or more, more preferably 80 or more, still more preferably 90 or more, and yet still more preferably 100 or more, and it is preferably 200 or less, more preferably 180 or less, still more preferably 160 or less, yet still more preferably 150 or less, even yet still more preferably 140 or less, even still more preferably 135 or less, and especially preferably less than 120.

The content of the base oil (a) in the gel composition is 80 parts by mass or more, preferably 83 parts by mass or more, and still more preferably 86 parts by mass or more based on 100 parts by mass of the total amount of the base oil (a) and the hydrogenated block copolymer (b), and an upper limit thereof is 99 parts by mass or less, preferably 97 parts by mass or less, and more preferably 94 parts by mass or less. When the content of the base oil (a) in the gel composition falls within the aforementioned range, in the case of using the gel composition as a filling material for cable during manufacturing a cable, the gel composition can be easily filled in the protective tube or cable.

Hydrogenated Block Copolymer (b)

The hydrogenated block copolymer (b) is a hydrogenated product of a diblock copolymer composed of a polymer block (A) consisting mainly of a structural unit derived from an aromatic vinyl compound and a polymer block (B) consisting mainly of a structural unit derived from a conjugated diene compound, the content of the polymer block (A) in the hydrogenated block copolymer (b) being 38.0 to 45.0% by mass.

The polymer block (A) and the polymer block (B) are hereunder described in order.

Polymer Block (A)

The polymer block (A) is one consisting mainly of a structural unit derived from an aromatic vinyl compound. The wording "consisting mainly of" as referred to in this specification refers to the fact that the structural unit derived from the aromatic vinyl compound is contained in an amount of 50% by mass or more based on the total mass of the polymer block (A). From the viewpoint of improving the dropping point of the gel composition, the content of the structural unit derived from the aromatic vinyl compound in the polymer block (A) is preferably 70% by mass or more, more preferably 80% by mass or more, still more preferably 90% by mass or more, and 95% by mass or more based on the total mass of the polymer block (A), and it may also be 100% by mass.

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4- dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromomethylstyrene, m-bromomethylstyrene, p-bromomethylstyrene, a silyl group-substituted styrene derivative, indene, and vinylnaphthalene.

Of these, from the viewpoint of production costs and a balance of physical properties, styrene, α-methylstyrene, p-methylstyrene, and a mixture thereof are preferred, and styrene is more preferred.

So far as not interfering with the effects of the present invention, the polymer block (A) may contain a structural unit derived from any other polymerizable monomer than aromatic vinyl compounds. Examples of the other polymerizable monomer include at least one selected from butadiene, isoprene, 2,3-dimethyl-1,3-butadiene, 1,3-pentadiene, 1,3-hexadiene, isobutylene, methyl methacrylate, methyl vinyl ether, β-pinene, 8,9-p-mentene, dipentene, methylene norbornene, and 2-methylenetetrahydrofuran.

In the case where the polymer block (A) contains a structural unit derived from the other polymerizable monomer, the bonding mode is not particularly limited, and it may be any of random and tapered ones.

In the case where the polymer block (A) contains a structural unit derived from the other polymerizable monomer than the aromatic vinyl compound, its content is preferably 30% by mass or less, more preferably 20% by mass or less, still more preferably 10% by mass or less, and yet still more preferably 5% by mass or less based on the total mass of the polymer block (A).

From the viewpoint of improving the dropping point of the gel composition, a peak top molecular weight (Mt) of the polymer block (A) is preferably 10,000 to 100,000, more preferably 15,000 to 70,000, still more preferably 30,000 to 59,000, yet still more preferably 30,000 to 50,000, even yet preferably 31,000 to 50,000, even still more preferably 40,000 to 50,000, even still more further preferably 41,000 to 50,000, and especially preferably 43,000 to 50,000.

The "peak top molecular weight" of the polymer block (A) described in this specification is a peak top molecular weight expressed in terms of standard polystyrene as determined by the gel permeation chromatography (GPC) measurement. In the production of the hydrogenated block copolymer (b), in the case where the aromatic vinyl compound is first polymerized to form the polymer block (A), and subsequently, the conjugated diene compound is polymerized to form the polymer block (B), the peak top molecular weight can be determined by after forming the polymer block (A), collecting a part of the reaction liquid and subjecting it to the GPC measurement. In addition, in the production of the hydrogenated block copolymer (b), in the case where the conjugated diene compound is first polymerized to form the polymer block (B), and subsequently, the aromatic vinyl compound is polymerized to form the polymer block (A), the peak top molecular weight can be determined by subtracting a peak top molecular weight (Mt) of the polymer block (B) from a peak top molecular weight (Mt) of the resulting block copolymer (before hydrogenation). In this case, the peak top molecular weight of the polymer block (B) can be determined by after forming the polymer block (B), collecting a part of the reaction liquid and subjecting it to the GPC measurement. In more detail, the foregoing peak top molecular weight is a value measured according to the method described in the section of Examples.

The content of the polymer block (A) in the hydrogenated block copolymer (b) is 38.0 to 45.0% by mass. When the content of the polymer block (A) falls within the aforementioned range, a viscosity that is preferred as a filling material for cable is revealed, the gel composition can be easily filled in the protective tube or cable during manufacturing a cable, and the dropping point of the gel composition is improved. From this viewpoint, the content of the polymer block (A) is preferably 38.0 to 44.0% by mass, more preferably 38.2 to 43.0% by mass, still more preferably 38.3 to 42.0% by mass, yet still more preferably 38.5 to 41.5% by mass, even yet still more preferably 39.0 to 41.0% by mass, and especially preferably 39.5 to 40.5% by mass.

In the present invention, from the viewpoint of enabling the filling material to be easily filled under a high shear rate condition so as to fill it in the protective tube or cable, the viscosity of the filling material is required to be low. On the other hand, from the viewpoint of making the filling material hard to flow out the cable under a low shear rate condition such that when a defect is generated during use of the cable, the filling materials flows out, the viscosity of the filling material is required to be high. For that reason, it is preferred that a ratio of the viscosity under a low shear rate condition to the viscosity under a high shear rate condition is high, and in the case of aiming to increase this viscosity ratio, the content of the polymer block (A) in the hydrogenated block copolymer (b) is preferably 40.5 to 45.0% by mass, and more preferably 41.0 to 44.5% by mass.

The content of the polymer block (A) in the hydrogenated block copolymer (b) is a value determined from a $^{1}$H-NMR spectrum, and in more detail, it is a value measured according to the method described in the section of Examples.

In the case where the content of the polymer block (A) is about 40.0 to 42.5% by mass, the viscosity can be suppressed low while maintaining the numerical value of the dropping point as mentioned later almost equivalent to that of a conventional product, and the gel composition can be easily filled in the protective tube or cable during manufacturing a cable. According to this, it becomes possible to improve a manufacturing efficiency of an optical fiber cable and the like. From the aforementioned viewpoint, the content of the polymer block (A) is more preferably 40.1 to 42.4% by mass, and still more preferably 40.2 to 42.3% by mass.

Polymer Block (B)

The polymer block (B) is one consisting mainly of a structural unit derived from a conjugated diene compound. The wording "consisting mainly of" as referred to in this specification refers to the fact that the structural unit derived from the conjugated diene compound is contained in an amount of 50% by mass or more based on the total mass of the polymer block (B). The content of the structural unit derived from the conjugated diene compound in the polymer block (B) is preferably 70% by mass or more, more preferably 80% by mass or more, still more preferably 90% by mass or more, and yet still more preferably 95% by mass or more based on the total mass of the polymer block (B), and it may also be 100% by mass. When the content of the structural unit derived from the conjugated diene compound in the polymer block (B) falls within the aforementioned range, solubility of the hydrogenated block copolymer (b) in the base oil (a) becomes high, and the production of the gel composition becomes easy.

Examples of the conjugated diene compound include conjugated diene compounds having 12 or less carbon atoms. Examples of the conjugated diene compound having 12 or less carbon atoms include butadiene, isoprene, 2,3-dimethyl-butadiene, 2-phenyl-butadiene, 1,3-pentadiene, 2-methyl- 1,3-pentadiene, 1,3-hexadiene, 1,3-octadiene, 1,3-cyclohexadiene, 2-methyl-1,3-octadiene, 1,3,7-octatriene, myrcene, and chloroprene. Of these, butadiene, isoprene, and myrcene are more preferred, butadiene and isoprene are still more preferred, and isoprene is yet still more preferred. These conjugated diene compounds may be used alone or may be used in combination of two or more thereof.

A bonding mode thereof may be any of random, tapered, completely alternate, partially block-shaped, or block-shaped ones, or a combination of two or more thereof.

From the viewpoint of improving the chopping point of the gel composition, a peak top molecular weight (Mt) of the polymer block (B) is preferably 50,000 to 120,000, more preferably 60,000 to 110,000, still more preferably 65,000 to 100,000, yet still more preferably 70,000 to 95,000, even yet preferably 73,000 to 93,000, even still more preferably 75,000 to 90,000, and especially preferably 78,000 to 88,400.

As the same manner as above, the "peak top molecular weight" of the polymer block (B) is a peak top molecular weight expressed in terms of standard polystyrene as determined by the gel permeation chromatography (GPC) measurement. In the production of the hydrogenated block copolymer (b), in the case where the aromatic vinyl compound is first polymerized to form the polymer block (A), and subsequently, the conjugated diene compound is polymerized to form the polymer block (B), the peak top molecular weight can be determined by subtracting a peak top molecular weight (Mt) of the polymer block (A) from a peak top molecular weight (Mt) of the resulting block copolymer (before hydrogenation). In this case, the peak top molecular weight of the polymer block (A) can be determined by after forming the polymer block (A), collecting a part of the reaction liquid and subjecting it to the GPC measurement. In addition, in the production of the hydrogenated block copolymer (b), in the case where the conjugated diene compound is first polymerized to form the polymer block (B), and subsequently, the aromatic vinyl compound is polymerized to form the polymer block (A), the peak top molecular weight can be determined by after forming the polymer block (B), collecting a part of the reaction liquid and subjecting it to the GPC measurement. In more detail, the foregoing peak top molecular weight is a value measured according to the method described in the section of Examples.

In the polymer block (B), the content of the vinyl bond structural unit (for example, in the case of a butadiene monomer, a 1,2-bond structural unit, and in the case of an isoprene monomer, a sum total of a 1,2-bond structural unit and a 3,4-bond structural unit) (the content of the vinyl bond structural unit will be hereinafter also referred to as "vinyl bond amount") is preferably 1 to 99 mol %, more preferably 1 to 90 mol %, still more preferably 1 to 80 mol %, yet still more preferably 1 to 50 mol %, even yet still more preferably 1 to 30 mol %, and even still more preferably 2 to 30 mol %.

In particular, in the case where the polymer block (B) is one consisting mainly of a structural unit derived from isoprene, the vinyl bond amount is preferably 1 to 70 mol %, more preferably 1 to 40 mol %, still more preferably 1 to 30 mol %, and yet still more preferably 2 to 10 mol %.

So far as not interfering with the effects of the present invention, the polymer block (B) may contain a structural unit derived from any other polymerizable monomer than conjugated diene compounds. Examples of the other polymerizable monomer include at least one selected from aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene; methyl methacrylate, methyl vinyl ether, N-vinylcarbazole, β-pinene, 8,9-p-menthene, dipentene, methylene norbornene, and 2-methylenetetrahydrofuran.

In the case where the polymer block (B) contains a structural unit derived from the other polymerizable monomer, the bonding mode is not particularly limited, and it may be any of random and tapered ones.

In the case where the polymer block (B) contains a structural unit derived from the other polymerizable monomer than the conjugated diene compound, its content is preferably 30% by mass or less, more preferably 20% by mass or less, still more preferably 10% by mass or less, and yet still more preferably 5% by mass or less based on the total mass of the polymer block (B).

A peak top molecular weight of the block copolymer (b) before the hydrogenation is preferably 20,000 to 500,000, more preferably 50,000 to 250,000, still more preferably 70,000 to 200,000, yet still more preferably 90,000 to 180,000, even yet still more preferably 100,000 to 160,000, even still more preferably 100,000 to 150,000, even still more further preferably 120,000 to 140,000, and especially preferably 130,000 to 140,000. When the peak top molecular weight of the block copolymer (b) before the hydrogenation is 20,000 or more, it becomes possible to adjust the viscosity to one suited for the gel composition; whereas when it is 500,000 or less, the time required for dissolving the hydrogenated block copolymer (b) in the base oil (a) becomes short, and it becomes possible to easily produce the gel composition.

As the same manner as above, the "peak top molecular weight" of the block copolymer (b) before the hydrogenation is a peak top molecular weight expressed in terms of standard polystyrene as determined by the gel permeation chromatography (GPC) measurement, and in more detail, it is a value measured according to the method described in the section of Examples.

The peak top molecular weight of the hydrogenated block copolymer (b) is preferably 20,000 to 500,000, more preferably 50,000 to 250,000, still more preferably 70,000 to 220,000, yet still more preferably 100,000 to 200,000, even yet still more preferably 110,000 to 180,000, even still more preferably 110,000 to 170,000, even still more further preferably 135,000 to 150,000, and especially preferably 141,000 to 150,000. When the peak top molecular weight of the hydrogenated block copolymer (b) is 20,000 or more, it becomes possible to adjust the viscosity to one suited for the gel composition; whereas when it is 500,000 or less, the time required for dissolving the hydrogenated block copolymer (b) in the base oil (a) becomes short, and it becomes possible to easily produce the gel composition.

As the same manner as above, the "peak top molecular weight" of the hydrogenated block copolymer (b) is a peak top molecular weight expressed in terms of standard polystyrene as determined by the gel permeation chromatography (GPC) measurement, and in more detail, it is a value measured according to the method described in the section of Examples.

Although, the molecular weight distribution (Mw/Mn) of the hydrogenated block copolymer (b) is not particularly limited, from the viewpoint of improving the dropping point of the gel composition, it is preferably 1.0 to 1.4, more preferably 1.0 to 1.3, still more preferably 1.0 to 1.2, and yet still more preferably 1.0 to 1.1. The molecular weight distribution (Mw/Mn) is a value calculated from Mw and Mn to be determined as the molecular weight expressed in terms of standard polystyrene by the gel permeation chromatography (GPC).

So far as not interfering with the effects of the present invention, the hydrogenated block copolymer (b) may have one or more functional groups, such as a carboxy group, a hydroxy group, an acid anhydride group, an amino group, and an epoxy group, in a molecular chain and/or molecular ends.

The gel composition of the present invention may contain two or more hydrogenated block copolymers (b). In addition, separately from the aforementioned hydrogenated block copolymer (b), a hydrogenated block copolymer (b') that is a hydrogenated product of a diblock copolymer composed of a polymer block (A') consisting mainly of a structural unit derived from an aromatic vinyl compound and a polymer block (B') consisting mainly of a structural unit derived from a conjugated diene compound, the content of the polymer block (A') being less than 38.0% by mass, may be contained.

Preferred examples of the polymer block (A') and the polymer block (B'), both of which constitute the hydrogenate block copolymer (b'), include the same materials as the polymer block (A) and the polymer block (B) as described for the aforementioned hydrogenated block copolymer (b), respectively.

Although a lower limit value of the content of the polymer block (A') in the hydrogenated block copolymer (b') is not particularly limited, it is preferably 5.0% by mass or more, more preferably 10.0% by mass or more, and still more preferably 20.0% by mass or more.

In the case where the gel composition of the present invention contains the hydrogenated block copolymer (b'), a mass ratio of the hydrogenated block copolymer (b) to the hydrogenated block copolymer (b') [hydrogenated block copolymer (b)/hydrogenated block copolymer (b')]]is 10/90 to 90/10, more preferably 20/80 to 80/20, and still more preferably 30/70 to 70/30.

A hydrogenation rate of the polymer block (B) in the hydrogenated block copolymer (b) is preferably 80 mol % or more, more preferably 85 mol % or more, still more preferably 90 mol % or more, yet still more preferably 95 mol % or more, and especially preferably 97 mol % or more. Although an upper limit value of the hydrogenation rate is not particularly limited, the upper limit value may be 99.5 mol %, and may be 99 mol %.

The hydrogenation rate is a value determined through the $^1$H-NMR measurement after the hydrogenation from the content of the carbon-carbon double bond in the structural unit derived from the conjugated diene compound in the polymer block (B), and in more detail, it is a value measured according to the method described in the section of Examples.

A melt flow rate (MFR) of the hydrogenated block copolymer (b) measured at 200° C. and 98N is preferably 0.1 to 100 g/10 min, and more preferably 0.5 to 50 g/10 min.

In this specification, the melt flow rate (MFR) indicates a value measured using a melt indexer (TAKARA L241, manufacture by Technol Seven Co., Ltd.) under a condition at 200° C. and 98N in conformity with the method of ISO 1133.

A glass transition temperature (Tg) of the hydrogenated block copolymer (b) is preferably −100 to 0° C., more preferably −80 to −20° C., still more preferably −70 to −30° C., and yet still more preferably −60 to −40° C. When the glass transition temperature of the hydrogenated block copolymer (b) falls within the aforementioned range, not only compatibility between the hydrogenated block copolymer (b) and the base oil (a) is improved, but also environmental characteristics of the gel composition are improved.

In this specification, the glass transition temperature of the hydrogenated block copolymer (b) means a glass transition temperature derived from the polymer block (B) which the hydrogenated block copolymer (b) has.

Production Method of Hydrogenated Block Copolymer (b)

The hydrogenated block copolymer (b) can be produced according to a solution polymerization method, an emulsion polymerization method, a solid-phase polymerization method, or the like. Above all, a solution polymerization method is preferred, and for example, a known method, such as an ionic polymerization method, e.g., anionic polymerization and cationic polymerization, and a radical polymerization method, is applicable. Above all, an anionic polymerization method is preferred. In the anionic polymerization method, an aromatic vinyl compound and a conjugated diene compound are successively added in the presence of a solvent, an anionic polymerization initiator, and optionally a Lewis base, to give a block copolymer, and subsequently, the polymer block (B) in the block copolymer is hydrogenated, whereby the hydrogenated block copolymer (b) can be obtained. The method of successively adding the aromatic vinyl compound and the conjugated diene compound may be a method in which the aromatic vinyl compound is added to undergo polymerization, and then, the conjugated diene compound is added to undergo polymerization, and it may also be a method in which the conjugated diene compound is added to undergo polymerization, and then, the aromatic vinyl compound is added to undergo polymerization.

Examples of an organolithium compound which is used as the anionic polymerization initiator in the aforementioned method include monolithium compounds, such as methyllithium, ethyllithium, pentyllithium, n-butyllithium, sec-butyllithium, and tert-butyllithium; and dilithium compounds, such as tetraethylene dilithium.

So far as not adversely affecting the anionic polymerization reaction, the solvent is not particularly limited, and examples thereof include aliphatic hydrocarbons, such as cyclohexane, methylcyclohexane, n-hexane, and n-pentane; and aromatic hydrocarbons, such as benzene, toluene, and xylene. In addition, the polymerization reaction is typically conducted at 0 to 100° C. for 0.5 to 50 hours.

The Lewis base plays a role for controlling a micro structure in the structural unit derived from the conjugated diene compound. Examples of the Lewis base include dimethyl ether, diethyl ether, tetrahydrofuran, dioxane, ethylene glycol dimethyl ether, pyridine, N,N,N'N'-tetramethylethylenediamine, trimethylamine, and N-methylmorpholine. The Lewis base may be used alone or may be used in combination of two or more thereof.

After conducting the polymerization by the aforementioned method, an active hydrogen compound, such as an alcohol, a carboxylic acid, and water, is added to terminate the polymerization reaction, and the resultant is hydrogenated in an inert organic solvent in the presence of a hydrogenation catalyst according to a known method, whereby a hydrogenated product can be formed.

The hydrogenation reaction can be carried out in the presence of a hydrogenation catalyst at a hydrogen pressure of preferably 0.1 to 20 MPa, more preferably 0.5 to 15 MPa, and still more preferably 0.5 to 5 MPa, and a reaction temperature of preferably 20 to 250° C., more preferably 50 to 180° C., and still more preferably 70 to 180° C., for a reaction time of typically 0.1 to 100 hours, and preferably 1 to 50 hours.

Examples of the hydrogenation catalyst include Raney nickel; heterogeneous catalysts in which a metal, such as platinum (Pt), palladium (Pd), ruthenium (Ru), rhodium (Rh), and nickel (Ni), is supported on a carrier, such as carbon, alumina, and diatomaceous earth; Ziegler-based catalysts composed of a combination of an organometallic compound made of a metal belonging to the Group 8, such as nickel and cobalt, with an organoaluminum compound, such as triethylaluminum and triisobutylaluminum, or an organolithium compound; and metallocene-based catalysts composed of a combination of a bis(cyclopentadienyl) compound of a transition metal, such as titanium, zirconium, and hafnium, with an organometallic compound of lithium, sodium, potassium, aluminum, zinc, magnesium, etc.

The thus obtained hydrogenated block copolymer (b) is optionally washed with water to remove the catalyst, and the hydrogenation reaction liquid is then precipitated and coagulated upon being poured with methanol or the like, followed by heating or vacuum drying; or the polymerization reaction liquid is poured in boiling water, and then, so-called steam stripping of removing the solvent through azeotrope is applied, followed by heating or vacuum drying, whereby a shape of crumb or powder can be given.

That is, the crumb for gel composition of the present invention is a crumb for gel composition composed of the hydrogenated block copolymer (b), wherein the hydrogenated block copolymer (b) is a hydrogenated product of a diblock copolymer composed of the polymer block (A) consisting mainly of a structural unit derived from an aromatic vinyl compound and the polymer block (B) consisting mainly of a structural unit derived from a conjugated diene compound, and the content of the polymer block (A) in the hydrogenated block copolymer (b) is 38.0 to 45.0% by mass. A preferred embodiment of the hydrogenated block copolymer (b) is one described above.

When the hydrogenated block copolymer (b) is a crumb or powder shape, on the occasion of producing a gel composition, the mixing time can be shortened, and the gel composition can be efficiently produced for a short time. In addition, in the case where the gel composition is produced for a short time, deterioration of the gel composition to be caused due to heat during mixing is suppressed, whereby the gel composition can be produced without impairing the physical properties of the gel composition, such as a dropping point.

Content of Hydrogenated Block Copolymer (b)

The content of the hydrogenated block copolymer (b) in the gel composition of the present invention is 1 to 20 parts by mass based on 100 parts by mass of the total amount of the base oil (a) and the hydrogenated block copolymer (b).

When the content of the hydrogenated block copolymer (b) falls within the aforementioned range, it becomes easy to fill the gel composition as a filling material for cable in the protective tube or cable during manufacturing a cable. From this viewpoint, the content of the hydrogenated block copolymer (b) is preferably 2 to 18 parts by mass, more preferably 4 to 16 parts by mass, still more preferably 6 to 14 parts by mass, yet still more preferably 7 to 13 parts by mass, and even yet still more preferably 8 to 12 parts by mass based on 100 parts by mass of the total amount of the base oil (a) and the hydrogenated block copolymer (b).

Other Component

The gel composition of the present invention may contain other component, such as an antioxidant, a surfactant, a pour point depressant, a defoaming agent, a gelling agent, a viscosity index improver, a thickener, a water absorbing agent, a flame retardant, a filler, a tackifier resin, a thixotropic agent, a petroleum wax, a metal deactivator, a copper passivator, and a friction modifier, as the need arises.

Examples of the antioxidant include a hindered phenol-based antioxidant, an aromatic amine-based antioxidant, a hindered amine-based antioxidant, a sulfide-based antioxidant, and an organophosphate-based antioxidant. Among these, a hindered phenol-based antioxidant, an aromatic amine-based antioxidant, and an organophosphate-based antioxidant are preferred, and a hindered phenol-based antioxidant is more preferred. These antioxidants may be used alone or may be used in combination of two or more thereof.

In the case where the gel composition of the present invention contains an antioxidant, the content of the antioxidant is preferably 0.01 to 1 part by mass, more preferably 0.02 to 0.5 parts by mass, and still more preferably 0.03 to 0.1 parts by mass based on 100 parts by mass of the total amount of the base oil (a) and the hydrogenated block copolymer (b).

As for the addition method of the antioxidant, the antioxidant may be added on the occasion of producing the gel composition, or it may be added on the occasion of producing the hydrogenated block copolymer. In the case of adding the antioxidant on the occasion of producing the hydrogenated block copolymer, the antioxidant can be added to and mixed with the solution of the copolymer after the polymerization reaction, the hydrogenation reaction, or washing with water. In addition, the antioxidant can also be added to and mixed with the hydrogenated block copolymer that is in a crumb or powder state. Above all, from the viewpoint that the antioxidant can be more uniformly mixed, thereby suppressing thermal deterioration of the hydrogenated block copolymer during the production of a gel composition, it is preferred to add the antioxidant to the solution of the copolymer after the polymerization reaction, the hydrogenation reaction, or washing with water, and it is more preferred to add the antioxidant to the solution of the copolymer after the hydrogenation reaction or washing with water. In the case of suppressing the thermal deterioration of the hydrogenated block copolymer during the production of a gel composition, the gel composition can be produced without impairing physical properties of the gel composition, such as a dropping point.

Production Method of Gel Composition

The gel composition of the present invention can be produced by adopting a well-known production method in this field. For example, the gel composition of the present invention can be produced by mixing the base oil (a), the hydrogenated block copolymer (b), and optionally the other component. The mixing can be conducted using a well-known mixing apparatus.

More specifically, the gel composition of the present invention can be produced by mixing the base oil (a), the hydrogenated block copolymer (b), and optionally the other component under air or nitrogen at 100 to 200° C. for 0.1 to 10 hours, and optionally, conducting evacuation, followed by cooling.

Characteristics of Gel Composition

Dropping Point

The dropping point (temperature of change of the gel composition from a semisolid to a liquid) of the gel composition of the present invention is preferably 180° C. or higher, more preferably 185° C. or higher, still more preferably 190° C. or higher, yet still more preferably 195° C. or higher, even yet still more preferably 200° C. or higher, and even still more preferably 205° C. or higher, and though an upper limit value thereof is not limited, it may be typically 400° C. or lower, and may be 300° C. or lower. When the dropping point of the gel composition falls within the aforementioned range, even in the case where the protective tube is broken, the gel composition has such characteristics that the gel composition as filling material does not flow out from the interior of the protective tube or cable even under a wide-range temperature.

The dropping point in this specification indicates a value measured by the method in conformity with JIS K2220:2013, and specifically, it indicates a value measured by the measurement method described in the section of Examples.

Viscosity

From the viewpoint that in the case where the protective tube or cable is damaged, the gel composition that is a filling material is suppressed from flowing out from the interior, the viscosity of the gel composition of the present invention under a shear rate condition of 50 $s^{-1}$ is preferably 500 mPa·s or more, more preferably 1,000 mPa·s or more, still more preferably 2,000 mPa·s or more, yet still more preferably 3,000 mPa·s or more, even yet still more preferably 3,500 mPa·s or more, and even still more preferably 3,800 mPa·s or more, and from the viewpoint of easily filling the gel composition in the protective tube or cable during manufacturing a cable, it is preferably 100,000 mPa·s or less, more preferably 50,000 mPa·s or less, still more preferably 11,000 mPa·s or less, and yet still more preferably 7,000 mPa·s or less.

From the aforementioned viewpoint, the viscosity of the gel composition of the present invention under a shear rate condition of 6 $s^{-1}$ is preferably 2,000 mPa·s or more, more preferably 4,000 mPa·s or more, and still more preferably 8,000 mPa·s or more, and it is preferably 120,000 mPa·s or less, more preferably 100,000 mPa·s or less, and still more preferably 80,000 mPa·s or less.

Furthermore, from the aforementioned viewpoint, the viscosity of the gel composition of the present invention under a shear rate condition of 1 $s^{-1}$ is preferably 4,000 mPa·s or more, more preferably 8,000 mPa·s or more, and still more preferably 10,000 mPa·s or more, and it is preferably 150,000 mPa·s or less, more preferably 120,000 mPa·s or less, and still more preferably 100,000 mPa·s or less.

The viscosity in this specification indicates a value measured with a rheometer, and specifically, it indicates a value measured by the method described in the section of Examples.

Viscosity Ratio

As for the filling material of the present invention, from the viewpoint of enabling the filling material to be easily filled in the protective tube or cable, it is preferred that the viscosity under a high shear rate condition is low, and from the viewpoint of making the filling material hard to flow out during breakage of the cable, it is preferred that the viscosity of the filling material under a low shear rate condition is high. Accordingly, a ratio of the viscosity under a low shear rate condition (1 $s^{-1}$) to the viscosity under a high shear rate condition (50 $s^{-1}$) is preferably 5 or more, more preferably 6 or more, still more preferably 7 or more, and yet still more preferably 8 or more, and it is typically 15 or less.

In order to allow the aforementioned ratio to fall within the aforementioned range, such can be achieved by regulating the content of the polymer block (A) in the hydrogenated block copolymer (b).

Oil Separation Degree

From the viewpoint of preventing separation of the gel composition in the protective tube or cable from occurring, the oil separation degree of the filling material of the present invention is preferably 1% or less, more preferably 0.8% or less, and still more preferably 0.6% or less. When the oil separation degree falls within the aforementioned range, it is indicated that the composition of the gel composition is uniform, and it is indicated that the gel composition is hardly separated.

The oil separation degree in this specification is a value measured after holding at 80° C. for 24 hours by the method in conformity of JIS K2220:2013, and specifically, it can be measured on a basis of the description of the section of Examples.

Other Application of Gel Composition

The gel composition of the present invention can be, for example, used for a cosmetic composition constituting a cosmetic product. Examples of the cosmetic product include:

hair makeup products, such as shampoos, hairsetting gels or lotions, blow-drying lotions, and fixing and styling agents;

skin makeup products, such as foundation creams, eye shadows, blushers, concealers, compact powders, and makeup bases;

lip makeup products, such as lipsticks, liquid lipsticks, and lip glosses;

cleansing products, such as cleansing foams and makeup removers; and cream products, such as vaseline creams, hand creams, and ultrasonic diagnostic gels.

The gel composition of the present invention can further be used for asphalt modifier, adhesive, pressure-sensitive adhesive, resin modifier, compatibilizer, sealing material, coating material, molded article, fiber nonwoven fabric, drilling fluid, and so on.

Cable Filling Material and Cable

The cable filling material of the present invention is one composed of the gel composition of the present invention.

The gel composition of the present invention has a viscosity that is preferred as a filling material for cable, is able to be easily filled in the protective tube or cable during manufacturing a cable, is high in a dropping point, and has such a characteristic that even in the case where the protective tube or cable is broken, the filling material does not flow out from the interior under a wide-range temperature and is also able to prevent water from penetration into the interior. Therefore, the cable filling material of the present invention is suitable as an internal cushioning material of cables, such as an optical fiber cable and an electrical wire cable.

The cable of the present invention is one including the gel composition of the present invention and is, for example, one in which the gel composition of the present invention is filled between the protective tube and the cable, or in the surrounding of the optical fiber wire core within the cable. As mentioned above, the gel composition of the present invention has elasticity sufficient for protecting a cable or the like, and further, not only it is able to be easily filled in the protective tube or cable, but also it has a viscosity to an extent that in the case where the protective tube or cable is broken, the filling material does not flow out from the interior, and even in the case where the protective tube or cable is broken, it is also able to prevent water from penetration into the interior. Therefore, the cable of the present invention can be suitably used especially as an optical fiber cable.

EXAMPLES

The present invention is hereunder specifically described by reference to Examples, but it should be construed that the present invention is by no means limited to these Examples. Each of the components used in the Examples and Comparative Examples is as follows.

Base Oil (a)

A base oil described in the following Table 1 was used.

TABLE 1

| | Component ratio | | | | |
|---|---|---|---|---|---|
| | Paraffin (% Cp) | Naphthene (% Cn) | Aroma (% Ca) | Viscosity index | Hue |
| Base oil (1) | 66 | 34 | 0 | 115 | Transparent |
| Base oil (2) | 74 | 26 | 0 | 130 | Transparent |
| Base oil (3) | 69 | 31 | 0 | 110 | Transparent |

Hydrogenated Block Copolymer (b)

The hydrogenated block copolymers (b) produced by the following production methods were used. Characteristics of each of the hydrogenated block copolymers are shown in Table 2.

Production Example 1: Production of Hydrogenated Block Copolymer (b1)

In a dry nitrogen-purged pressure tight vessel, 2,500 g of cyclohexane was charged, 7.80 mL of sec-butyllithium (1.01 mol/L, cyclohexane solution) was used as an anionic polymerization initiator, and 310 g of styrene and 492 g of isoprene were successively added to undergo polymerization, thereby giving a reaction liquid containing a diblock copolymer. The polymerization of styrene was conducted under a condition at 50° C. for 0.5 hours, and the polymerization of isoprene was conducted under a condition at 50° C. for 6.5 hours.

To this reaction liquid, a Ziegler-based hydrogenation catalyst formed from nickel octylate and trimethylaluminum was added in a hydrogen atmosphere, and the contents were allowed to react with each other for 4 hours under a condition at a hydrogen pressure of 1.0 MPa and 80° C. Subsequently, after allowing the reaction liquid to stand for cooling and pressure discharge, the catalyst was removed by washing with water and then subjected to vacuum drying, to give a hydrogenated product of a polystyrene-polyisoprene diblock copolymer (hereinafter also referred to as "copolymer (b1)"). The resulting copolymer (b1) was evaluated for physical properties according to the following methods. The results are shown in Table 2. Before the aforementioned vacuum drying, precipitation and coagulation operations were conducted, and the resulting copolymer was in a state of crumb.

Production Examples 2 to 11: Production of Hydrogenated Block Copolymers (b2) to (b7) and Comparative Copolymer (x1) to (x4)

Hydrogenated block copolymers (b2) to (b7) (hereinafter also referred to as "copolymers (b2) to (b7)") and comparative copolymers (x1) to (x4) were produced in the same manner as in Production Example 1, except that the amounts of styrene and isoprene and the reaction condition were changed so as to have peak top molecular weights shown in Table 2, respectively. The resulting copolymers and comparative copolymers were each evaluated for physical properties according to the following methods. The results are shown in Table 2. The resulting copolymers and comparative copolymers were each in a state of crumb.

TABLE 2

| | Copolymer | | | | | | | Comparative copolymer | | | |
|---|---|---|---|---|---|---|---|---|---|---|---|
| | b1 | b2 | b3 | b4 | b5 | b6 | b7 | x1 | x2 | x3 | x4 |
| Peak top molecular weight (Mt) of polymer block (A) (styrene) | 38300 | 35800 | 45700 | 41400 | 44000 | 44900 | 47300 | 36000 | 38200 | 52600 | 45100 |
| Peak top molecular weight (Mt) of polymer block (B) (isoprene) | 87900 | 86800 | 88300 | 86800 | 92000 | 90700 | 87100 | 88500 | 93800 | 79300 | 118900 |

TABLE 2-continued

| | Copolymer | | | | | | | Comparative copolymer | | | |
|---|---|---|---|---|---|---|---|---|---|---|---|
| | b1 | b2 | b3 | b4 | b5 | b6 | b7 | x1 | x2 | x3 | x4 |
| Peak top molecular weight (Mt) of copolymer before hydrogenation | 126200 | 122600 | 134000 | 128200 | 136000 | 135600 | 134400 | 124500 | 132000 | 131900 | 164000 |
| Peak top molecular weight (Mt) of hydrogenated block copolymer (b) | 137100 | 138300 | 141100 | 143900 | 149000 | 148400 | 146700 | 131900 | 140200 | 143100 | 179000 |
| Content of polymer block (A) in hydrogenated block copolymer (% by mass) | 39.0 | 39.5 | 40.3 | 41.3 | 41.4 | 42.2 | 44.5 | 37.5 | 37.5 | 49.5 | 35.1 |
| Molecular weight distribution of hydrogenate block copolymer (b) | 1.03 | 1.03 | 1.05 | 1.04 | 1.06 | 1.06 | 1.04 | 1.04 | 1.03 | 1.05 | 1.08 |
| Hydrogenation rate (mol %) | 98.9 | 98.6 | 98.9 | 98.2 | 99.0 | 99.1 | 99.3 | 98.7 | 98.6 | 99.1 | 98.1 |

Antioxidant

Hindered phenol-based antioxidant: AO-60, manufacture by ADEKA Corporation

Measurement Methods of Physical Properties of Hydrogenated Block Copolymer (b) and Comparative Copolymer (x)

(1) Peak top molecular weight (Mt) and molecular weight distribution (Mw/Mn)

The peak top molecular weight (Mt) as expressed in terms of polystyrene of each of the copolymers, the polymer blocks (A), and the polymer blocks (B) was determined by the gel permeation chromatography (GPC) measurement under the following condition. In addition, the molecular weight distribution (Mw/Mn) was calculated from the weight average molecular weight (Mw) and the number average molecular weight (Mn) determined as a molecular weight as expressed in terms of standard polystyrene by the gel permeation chromatography (GPC).

GPC measuring Apparatus and Measuring Condition

Apparatus: GPC apparatus "HLC-8320" (manufactured by Tosoh Corporation)
Separation columns: Two columns "TSKgel Super HZ4000" (manufactured by Tosoh Corporation) were serially concatenated.
Eluent: Tetrahydrofuran
Eluent flow rate: 0.35 mL/min
Sample concentration: 5 mg/10 mL
Column temperature: 40° C.
Detector: Differential refractive index (RI) detector
Calibration curve: Prepared using standard polystyrene

(2) Content of Polymer Block (A)

The copolymer after hydrogenation was dissolved in $CDCl_3$ and measured for a $^1$H-NMR spectrum [apparatus: "ULTRASHIELD 400 PLUS" (manufactured by Bruker Corporation), measuring temperature: 50° C.], and the content of the polymer block (A) was calculated from a ratio of a peak area derived from the styrene polymer block and a peak area derived from the hydrogenated isoprene polymer block.

(3) Hydrogenation Rate of Copolymer

The block copolymer before and after hydrogenation was dissolved in $CDCl_3$ and measured for a $^1$H-NMR spectrum [apparatus: "ULTRASHIELD 400 PLUS" (manufactured by Bruker Corporation), measuring temperature: 50° C.], and the hydrogenation rate was determined from a reduction rate in a peak area ratio derived from a carbon-carbon double bond of each of the conjugated diene polymer blocks before and after hydrogenation.

Examples 1 to 14 and Comparative Examples 1 to 8

The base oil (a), the hydrogenated block copolymer (b), and the antioxidant were mixed under nitrogen at 170° C. for 3 hours by using a three-one motor, manufactured by Shinto Scientific Co., Ltd. according to the compounding described in each of Tables 3 to 5. Thereafter, the mixture was cooled to room temperature to prepare a gel composition.

The resulting gel composition was measured for the dropping point and viscosity by the following methods. The results are shown in Tables 3 to 5. In addition, the resulting gel composition was measured for the oil separation degree by the following method. The results are shown in Table 5.

Dropping Point

The dropping point was measured according to the method in conformity with JIS K2220:2013. That is, the dropping point was measured in the following manner: the gel composition was charged in a prescribed sample container; the temperature was raised at a rate of 4 to 7° C./min up to a temperature lower by 17° C. than the dropping point; then, the temperature was continuously raised at a rate of 1.0 to 1.5° C./min; and a temperature when the gel composition was softened and dropped from a hole of the sample container was determined.

Viscosity

The viscosity was measured with a rheometer (R/S+ RHEOMETER, manufactured by Brookfield) at 25° C. under a shear rate condition of 1 $s^{-1}$, 6 $^{-1}$, and 50 $s^{-1}$. In more detail, about 30 mL of the gel composition was charged in a sample chamber (MB3-25F, manufactured by Brookfield), which was then installed in the body of the rheometer set with a spindle (CC3-25, manufactured by Brookfield), and the measurement was conducted at 25° C. for 300 seconds at a shear rate of 1 $s^{-1}$, thereby achieving stabilization. Subsequently, (1) the shear rate was increased from 1 $s^{-1}$ to 50 $s^{-1}$ over 120 seconds and then decreased from 50 $s^{-1}$ to 1 $s^{-1}$ over 120 seconds; subsequently, (2) the shear rate was increased from 1 $s^{-1}$ to 50 $s^{-1}$ over 120 seconds and then decreased from 50 $s^{-1}$ to 1 $s^{-1}$ over 120 seconds; and further subsequently, (3) the shear rate was increased from 1 $s^{-1}$ to 50 $s^{-1}$ over 120 seconds and then decreased from 50 $s^{-1}$ to 1 $s^{-1}$ over 120 seconds. The viscosity at a shear rate condition of 1 $s^{-1}$, 6 $s^{-1}$, and 50 $s^{-1}$ as obtained in the measurement of the process of increasing the shear rate in the above (3) from 1 $s^{-1}$ to 50 $s^{-1}$ over 120 seconds was adopted. The 1 $s^{-1}$ viscosity, the 6 $s^{-1}$ viscosity, and the 50 $s^{-1}$ viscosity shown in Tables 3 to 5 mean the viscosities under a shear rate condition of 1 $s^{-1}$, 6 $s^{-1}$, and 50 $s^{-1}$, respectively.

Oil Separation Degree

The oil separation degree was measured according to the method in conformity with JIS K2220:2013. In more detail, the oil separation degree was measured in the following manner: 10 g of the gel composition was weighed and charged in a wire mesh cone filter (cone filter made of a stainless steel wire mesh having an opening of 250 μm (wire diameter: 160 μm) as prescribed in JIS Z8801-1) and held at 80° C. for 24 hours; and then, a mass of the oil separated from the gel composition was measured, from which was then calculated the oil separation degree.

TABLE 3

| | | | Example | | | | | | |
|---|---|---|---|---|---|---|---|---|---|
| | | | 1 | 2 | 3 | 4 | 5 | 6 | 7 |
| Composition of gel composition | Proportion of base oil and copolymer (% by mass) | Base oil (1) | 90 | 90 | 90 | 90 | 92 | 88 | 92 |
| | | Base oil (2) | | | | | | | |
| | | Base oil (3) | | | | | | | |
| | | Copolymer (b1) | 10 | | | | | | |
| | | Copolymer (b2) | | 10 | | | 8 | 12 | |
| | | Copolymer (b3) | | | 10 | | | | 8 |
| | | Copolymer (b4) | | | | 10 | | | |
| | | Copolymer (b5) | | | | | | | |
| | | Copolymer (b6) | | | | | | | |
| | | Copolymer (b7) | | | | | | | |
| | | Comparative copolymer (x1) | | | | | | | |
| | | Comparative copolymer (x2) | | | | | | | |
| | | Comparative copolymer (x3) | | | | | | | |
| | | Comparative copolymer (x4) | | | | | | | |
| | Antioxidant [parts by mass] (*1) | | 0.05 | 0.05 | 0.05 | 0.05 | 0.04 | 0.06 | 0.04 |
| Evaluation | Dropping point [° C.] | | 200 | 201 | 206 | 195 | 187 | 207 | 201 |
| | 1 $s^{-1}$ viscosity [mPa · s] | | 81540 | 78010 | 45000 | 60090 | 44850 | 132480 | 27890 |
| | 6 $s^{-1}$ viscosity [mPa · s] | | 29090 | 27320 | 15680 | 20880 | 16410 | 46950 | 10420 |
| | 50 $s^{-1}$ viscosity [mPa · s] | | 10900 | 9930 | 6590 | 7420 | 5910 | 18400 | 3910 |
| | Viscosity ratio [(1 $s^{-1}$ viscosity)/(50 $s^{-1}$viscosity)] | | 7.48 | 7.86 | 6.83 | 8.10 | 7.59 | 7.20 | 7.13 |

*1: Amount based on 100 parts by mass of the total amount of the base oil and the copolymer [parts by mass]

TABLE 4

| | | | Example | | Comparative Example | | | | |
|---|---|---|---|---|---|---|---|---|---|
| | | | 8 | 9 | 1 | 2 | 3 | 4 | 5 |
| Composition of gel composition | Proportion of base oil and copolymer (% by mass) | Base oil (1) | 88 | | 90 | 90 | | 92 | 88 |
| | | Base oil (2) | | 90 | | | 90 | | |
| | | Base oil (3) | | | | | | | |
| | | Copolymer (b1) | | | | | | | |
| | | Copolymer (b2) | | 10 | | | | | |

TABLE 4-continued

| | | Example | | Comparative Example | | | | |
|---|---|---|---|---|---|---|---|---|
| | | 8 | 9 | 1 | 2 | 3 | 4 | 5 |
| | Copolymer (b3) | 12 | | | | | | |
| | Copolymer (b4) | | | | | | | |
| | Copolymer (b5) | | | | | | | |
| | Copolymer (b6) | | | | | | | |
| | Copolymer (b7) | | | | | | | |
| | Comparative copolymer (x1) | | | 10 | | | | |
| | Comparative copolymer (x2) | | | | 10 | 10 | 8 | 12 |
| | Comparative copolymer (x3) | | | | | | | |
| | Comparative copolymer (x4) | | | | | | | |
| | Antioxidant [parts by mass] (*1) | 0.06 | 0.05 | 0.05 | 0.05 | 0.05 | 0.05 | 0.05 |
| Evaluation | Dropping point [° C.] | 207 | 207 | 191 | 195 | 203 | 184 | 199 |
| | 1 $s^{-1}$ viscosity [mPa · s] | 82170 | 45340 | 78360 | 91860 | 67950 | 44760 | 133570 |
| | 6 $s^{-1}$ viscosity [mPa · s] | 29490 | 15250 | 29350 | 32750 | 24710 | 17330 | 51030 |
| | 50 $s^{-1}$ viscosity [mPa · s] | 13340 | 6200 | 11350 | 12090 | 9800 | 6600 | 21300 |
| | Viscosity ratio [(1 $s^{-1}$ viscosity)/(50 $s^{-1}$viscosity)] | 6.16 | 7.31 | 6.90 | 7.60 | 6.93 | 6.78 | 6.27 |

*1: Amount based on 100 parts by mass of the total amount of the base oil and the copolymer [parts by mass]

TABLE 5

| | | | Example | Comparative Example | | Example | | | | Comparative Example |
|---|---|---|---|---|---|---|---|---|---|---|
| | | | 10 | 6 | 7 | 11 | 12 | 13 | 14 | 8 |
| Composition of gel composition | Proportion of base oil and copolymer (% by mass) | Base oil (1) | | | | 90 | 90 | 90 | | 90 |
| | | Base oil (2) | | | | | | | 85 | |
| | | Base oil (3) | 90.9 | 90.9 | 90.9 | | | | | |
| | | Copolymer (b1) | | | | | | | | |
| | | Copolymer (b2) | | | | | | | | |
| | | Copolymer (b3) | | | | | | | | |
| | | Copolymer (b4) | | | | | | | | |
| | | Copolymer (b5) | 9.1 | | | 10 | | | 15 | |
| | | Copolymer (b6) | | | | | 10 | | | |
| | | Copolymer (b7) | | | | | | 10 | | |
| | | Comparative copolymer (x1) | | | | | | | | |
| | | Comparative copolymer (x2) | | 9.1 | | | | | | |
| | | Comparative copolymer (x3) | | | | | | | | 10 |
| | | Comparative copolymer (x4) | | | 9.1 | | | | | |
| | Antioxidant [parts by mass] (*1) | | 0.046 | 0.046 | 0.046 | 0.05 | 0.05 | 0.05 | 0.075 | 0.05 |
| Evaluation | Dropping point [° C.] | | 203 | 199 | 193 | 200 | 201 | 199 | 204 | *3 |
| | 1 $s^{-1}$ viscosity [mPa · s] | | 43200 | 64140 | 45020 | 56730 | 49700 | 35500 | *2 | |
| | 6 $s^{-1}$ viscosity [mPa · s] | | 14700 | 24420 | 17100 | 20340 | 17000 | 12000 | *2 | |
| | 50 $s^{-1}$ viscosity [mPa · s] | | 5100 | 8800 | 7400 | 6930 | 6100 | 4400 | *2 | |
| | Viscosity ratio [(1 $s^{-1}$ viscosity)/(50 $s^{-1}$viscosity)] | | 8.47 | 7.29 | 6.08 | 8.19 | 8.15 | 8.07 | *2 | |
| | Oil separation degree at 80° C. [%] | | 0.5 | 1.3 | 16.7 | *2 | *2 | *2 | *2 | |

*1: Amount based on 100 parts by mass of the total amount of the base oil and the copolymer [parts by pass]

*2: No data

*3: Dissolution residues were present, and a uniform gel composition was not given.

Consideration

In comparison between Examples 1 to 4 and Comparative Examples 1 to 2, in which the base oil (1) is used, and the content of the copolymer is 10 parts by mass based on 100 parts by mass of the total amount of the base oil and the copolymer, it could be confirmed that the gel compositions of Examples 1 to 3 are not only high in the dropping point but also low in the viscosity under a shear rate condition of 50 $s^{-1}$ as compared with those of all of the Comparative Examples. In addition, though the gel composition of Example 4 is the same in the dropping point as the gel composition of Comparative Example 2, it could be confirmed that its viscosity under a shear rate condition of 50 $s^{-1}$ is low.

In addition, in comparison between Examples 5 and 7 and Comparative Example 4, in which the base oil (1) is used, and the content of the copolymer is 8 parts by mass based on 100 parts by mass of the total amount of the base oil and the copolymer, it could be confirmed that even in the case where the addition amount of the copolymer is small, the gel compositions of the present invention are not only high in the dropping point but also low in the viscosity under a shear rate condition of 50 $s^{-1}$. In particular, in view of the fact that Example 7 is high in the dropping point as compared with Comparative Examples 1 and 2 in which the content of the comparative copolymer is 10 parts by mass, and Comparative Example 5 in which the content of the comparative copolymer is 12 parts by mass, not only it was noted that even when the content of the copolymer (b3) is small, the effect for improving the dropping point is high, but also it could be confirmed that the viscosity under a shear rate condition of 50 $s^{-1}$ is low.

Furthermore, even in comparison between Example 9 and Comparative Example 3, in which the base oil (2) is used, it could be confirmed that the gel composition of Example 9 is not only high in the dropping point but also low in the viscosity under a shear rate condition of 50 $s^{-1}$.

In comparison between Example 10 and Comparative Examples 6 and 7, in which the base oil (3) is used, and the kind of the copolymer is respectively changed, it is noted that the gel composition of the present invention is low in the viscosity under a shear rate condition of 50 $s^{-1}$. In addition, in Example 10, the viscosity ratio is high, and therefore, it is noted that the filling material can be easily filled in the protective tube or cable, and when the protective tube or cable is broken, etc., the filling material is hard to flow out. Furthermore, in Example 10, the oil separation degree is low, and therefore, it is noted that the filling material of Example 10 is one having a uniform composition.

It is noted from the results of Examples 11 to 13 that even in the case of combining the base oil (1) with the copolymers (b5) to (b7), respectively, the filling material which is low in the viscosity under a shear rate condition of 50 $s^{-1}$ is obtained. On the other hand, from the results of Comparative Example 8, in combining the base oil (1) with the comparative copolymer (x3), a uniform gel composition was not obtained.

In the light of the above, in view of the fact that the gel composition of the present invention has viscosity and dropping point preferred as the filling material for cable, it could be confirmed that the gel composition of the present invention is able to be easily filled in the protective tube or cable during manufacturing a cable, and even in the case where the protective tube or cable is broken, the filling material is hard to flow out from the interior.

The invention claimed is:

1. A gel composition, comprising:

a base oil and a hydrogenated block copolymer, wherein the hydrogenated block copolymer is a hydrogenated product of a diblock copolymer composed of a first polymer block consisting of a structural unit derived from an aromatic vinyl compound in an amount of 50% by mass or more based on the total mass of the first polymer block, and a second polymer block consisting of a structural unit derived from isoprene in an amount of 50% by mass or more based on the total mass of the second polymer block, the content of the first polymer block in the hydrogenated block copolymer being from 38.0 to 45.0% by mass, the content of a vinyl bond structural unit in the second polymer block is from 2 to 10 mol %, and the content of the hydrogenated block copolymer in the gel composition is from 1 to 20 parts by mass based on 100 parts by mass of the total amount of the base oil and the hydrogenated block copolymer.

2. The gel composition according to claim 1, wherein a peak top molecular weight of the hydrogenated block copolymer is from 50,000 to 250,000.

3. The gel composition according to claim 1, wherein a hydrogenation rate of the second polymer block in the hydrogenated block copolymer is from 90 to 99.5 mol %.

4. The gel composition according to claim 1, wherein a viscosity index of the base oil is from 70 to 150.

5. The gel composition according to claim 1, wherein the base oil is at least one selected from paraffin-based mineral oils and naphthene-based mineral oils.

6. The gel composition according to claim 1, wherein the base oil comprises a paraffin and a naphthene, and a mass ratio of the paraffin to the naphthene [paraffin/naphthene] is from 60/40 to 90/10.

7. The gel composition according to claim 1, further comprising an antioxidant in an amount of 0.01 to 1 part by mass based on 100 parts by mass of the total amount of the base oil and the hydrogenated block copolymer.

8. The gel composition according to claim 1, wherein a viscosity of the gel composition under a shear rate condition of 50 $s^{-1}$ is 500 to 100,000 mPa·s.

9. The gel composition according to claim 1, wherein a ratio of a viscosity under a shear rate condition of 1 $s^{-1}$ to a viscosity under a shear rate condition of 50 $s^{-1}$ is 5 or more.

10. The gel composition according to claim 1, wherein a separation oil degree of the gel composition is 1% or less.

11. A cable filling material, which is composed of the gel composition according to claim 1.

12. A cable, comprising the gel composition according to claim 1.

13. The cable according to claim 12, which is an optical fiber cable.

14. A crumb for gel composition, comprising a hydrogenated block copolymer, wherein the hydrogenated block copolymer is a hydrogenated product of a diblock copolymer composed of a first polymer block consisting of a structural unit derived from an aromatic vinyl compound in an amount of 50% by mass or more based on the total mass of the first polymer block, and a second polymer block consisting of a structural unit derived from isoprene in an amount of 50% by mass or more based on the total mass of the second polymer block, the content of the first polymer block in the hydrogenated block copolymer being from 38.0 to 45.0% by mass, and the content of a vinyl bond structural unit in the second polymer block is from 2 to 10 mol %.

15. The gel composition according to claim 1, wherein the hydrogenated block copolymer is the only hydrogenated block copolymer in the composition.

16. The crumb according to claim 14, wherein the hydrogenated block copolymer is the only hydrogenated block copolymer in the composition.

* * * * *